May 31, 1966  F. D. LAKINS  3,253,721

ARTICLE HANDLING APPARATUS

Filed April 6, 1964  4 Sheets-Sheet 1

INVENTOR.
FRANKLIN D. LAKINS.
BY
D. Emmett Thompson
HIS ATTORNEY.

United States Patent Office 3,253,721
Patented May 31, 1966

3,253,721
ARTICLE HANDLING APPARATUS
Franklin D. Lakins, Syracuse, N.Y., assignor to Lipe Rollway Corporation, Syracuse, N.Y., a corporation of New York
Filed Apr. 6, 1964, Ser. No. 357,676
1 Claim. (Cl. 214—1)

This invention relates to and has a general object a new and improved bar stock bundle handling apparatus.

Bar stock of round or other cross-sectional type is conventionally shipped in bundles, wherein the rods or bars may be as long as twenty-two feet, and the total weight of the bundle may be as high as ten thousand pounds. Such bundles are held together by steel straps, or the like, which are fastened around the bundle at various points intermediate the ends of the bars. In many instances, the individual bars or rods are fed into bar working machines, such as lathes, grinders, or the like, by bar feed machines, of the type shown and disclosed in Lakins Patent No. 3,092,288, issued June 4, 1963. Such bar feed machines are adapted to feed bar stock which is positioned in the magazine forward through a bar feed guide tube in intermittent fashion into the bar working machine. In many such setups, the entire operation is automated, save only the loading of the bar stock into the bar feed magazine, which has heretofore been a manual operation.

Accordingly, it is a more specific object of this device to provide a new and improved bar stock bundle handling machine which serves to discharge bar stock from the machine in single fashion, into the magazine of a bar feed machine, or the like.

In previous manual handling of bundles of bar stock, one problem has been that when the bundle straps are severed, the bundle collapses under its own weight, so that the individual pieces of bar stock become scrambled, rendering it difficult and time consuming for the loader to sort and load the individual pieces of bar stock into a bar feed magazine.

It is a further object of the invention therefore, to provide a new and improved bar stock bundle handling machine, which serves to unscramble the individual pieces of bar stock whereby to permit the discharge of the bar stock from the machine in single fashion.

Briefly described, the machine comprising the preferred embodiment of the invention is made up of a long box, capable of containing bar stock up to 22 feet in length, and bundles of such bar stock weighing as much as ten thousand pounds. The box is pivotally mounted along its center line and means are provided for alternately tilting the box along its pivot points up to 10° on both sides of horizontal, which causes the bar stock to roll from side to side until the individual bars are lying straight and are unscrambled. Thereafter, one side of the box is provided with selectively operable discharge means which functions to discharge the bar stock from the box in single fashion.

The invention consists in the novel features and constructions and the method hereinafter set forth and claimed.

In describing the invention, reference is had to the accompanying drawings in which like characters designate corresponding parts in all the views.

Figure 1:
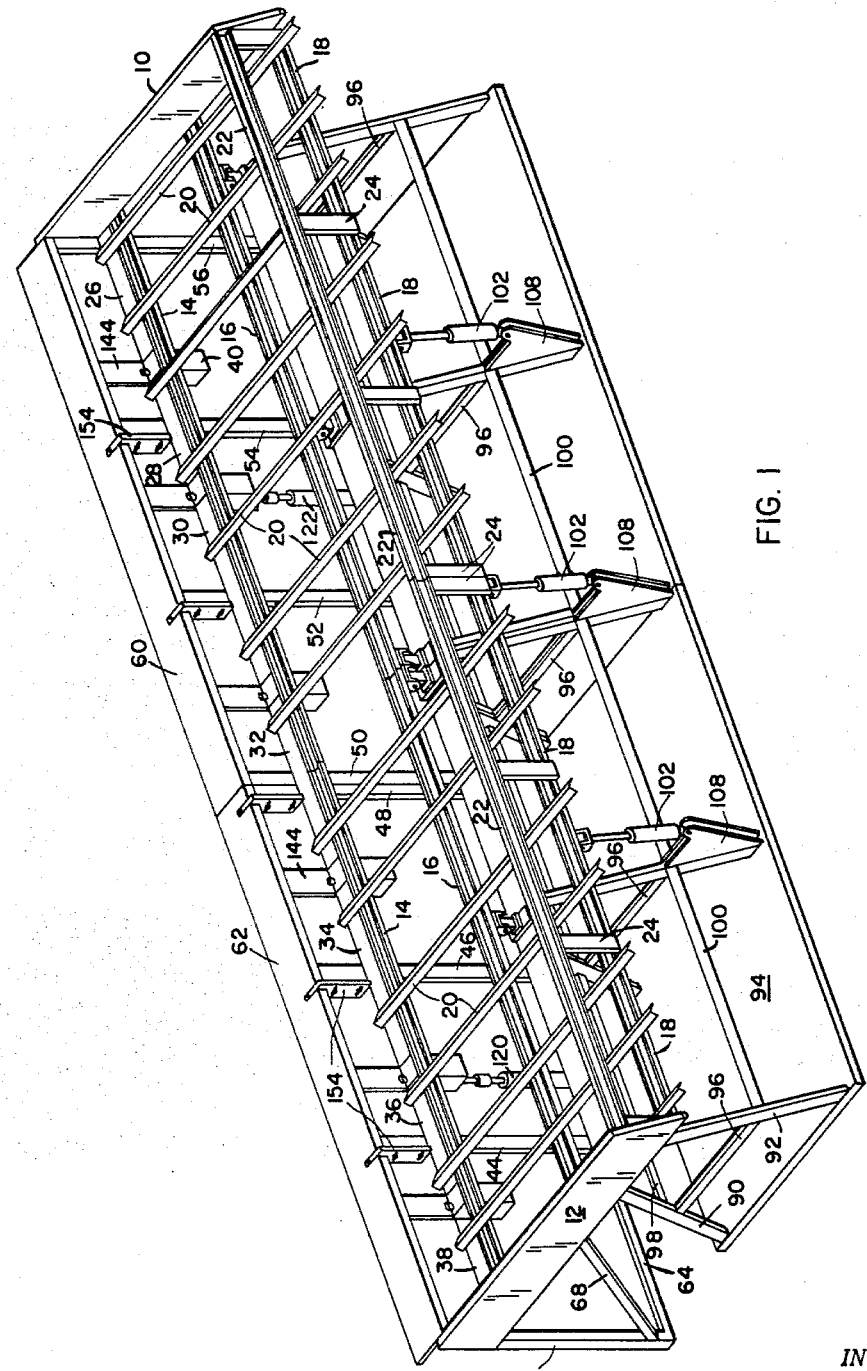
FIGURE 1 is a perspective view of a preferred embodiment of the invention.

The bar stock receiving box of the machine comprising the preferred embodiment of the invention, as best seen in FIGURE 1, is made up of a pair of end plates 10 and 12, which are secured by any suitable means, such as welding or the like, along their lower edges to transversely extending channel members 14, 16 and 18. The channel members 14, 16 and 18 are shown as being formed of two sections having a joint between the sections at the mid portion of the machine. This is for ease of manufacturing and for greater flexibility of intended use, the two sections being joined together for long pieces of bar stock, and a single section being sufficient for use in the case of shorter bar stock.

A plurality of cross rail angle irons 20 extend across the channel members 14, 16 and 18 and are affixed thereto by welding, or the like, to provide a floor for the machine. Any suitable number of cross rails may be used, and 12 have been shown in the embodiment shown in the drawings. The outer upper side edge of the box is formed by a pair of channel members 22, which are affixed at their ends to the plates 10 and 12, and are joined together at their mid portion. The channel members 22 are braced in position by a plurality of upstanding strut members 24, which are welded between the upper edge of the channel members 18, and the underside of the channel members 22.

Figure 4:
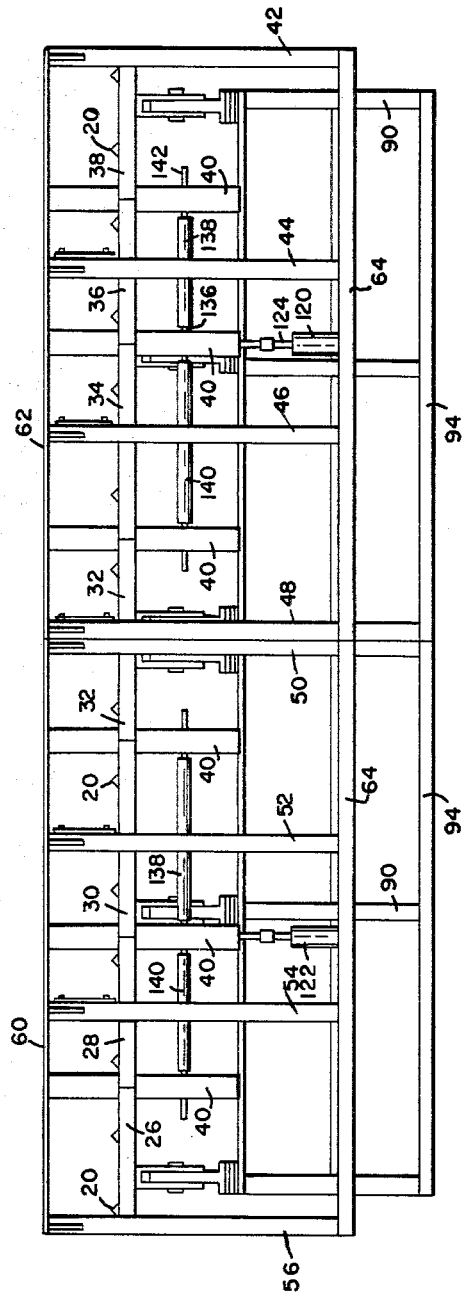
FIGURE 4 is a front elevational view of the machine shown in FIGURE 1.

The opposite upstanding sidewall of the box is formed by a plurality of short channel pieces 26, 28, 30, 32, 34, 36 and 38, each of the pieces being welded, or otherwise suitably fixed to the end plates 10 and 12 in the case of pieces 26 and 38, and to the opposite sides of housings 40, which are located between the pieces 26 through 28, inclusive. As best seen in FIGURES 1 and 4, the outside edges of the pieces 26 through 38 have transversely extending channel members 42, 44, 46, 48, 50, 52, 54 and 56 affixed thereto, while the inside edges of the pieces 26 through 38 are affixed to the channel members 14. The endmost upstanding channel members 42 and 56 are affixed to the end plates 10 and 12, and a pair of flat discharge plates 60 and 62 are affixed to the upper edges of the numbers 42 through 56, inclusive, for a purpose to be hereinafter described. The lower ends of the members 42 through 56, inclusive, are affixed to and joined together by a channel member 64 to give the entire side section sufficient rigidity.

Figure 2:
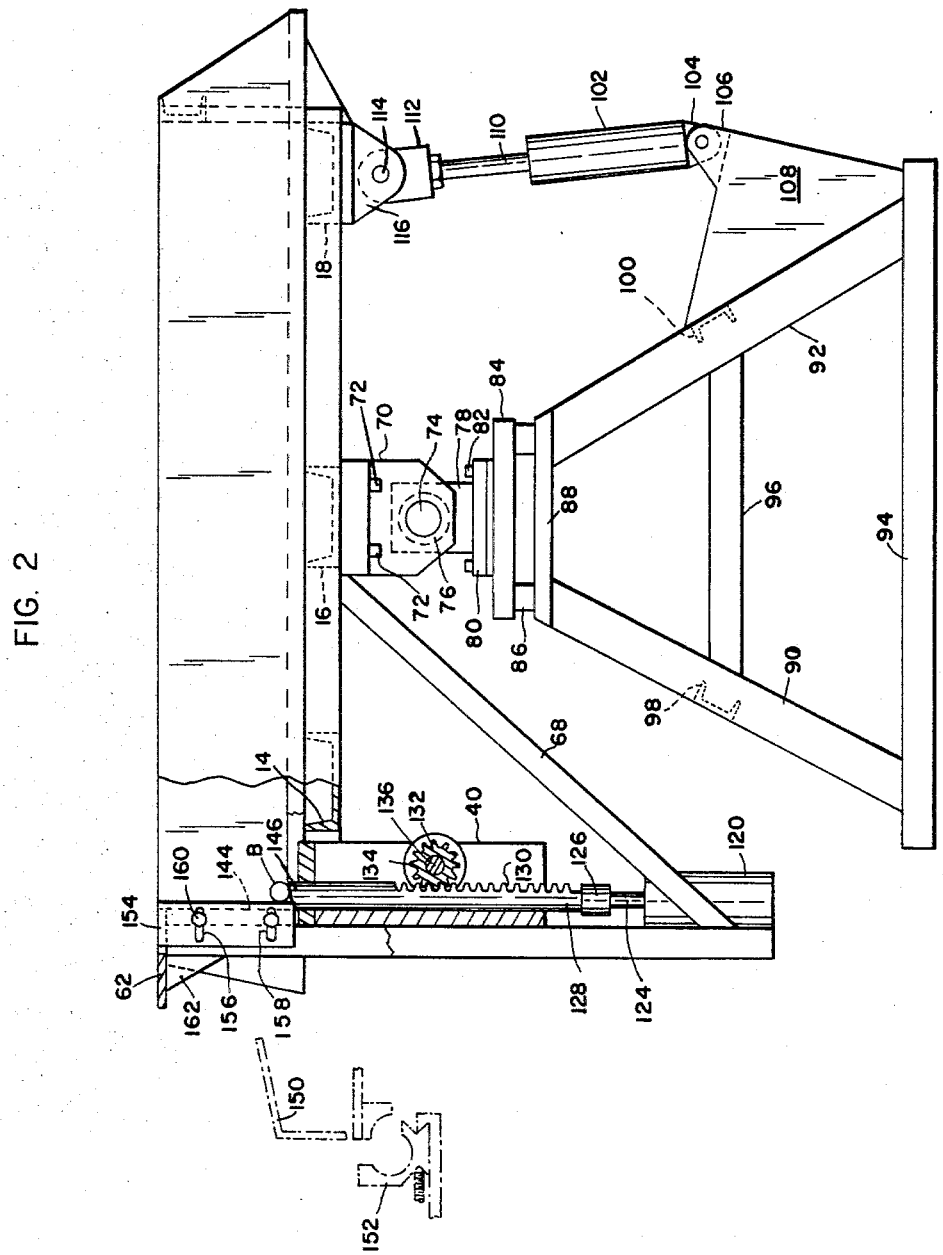
FIGURE 2 is an end elevational view of the machine shown in FIGURE 1, with parts broken away and parts in section.
Figure 3:
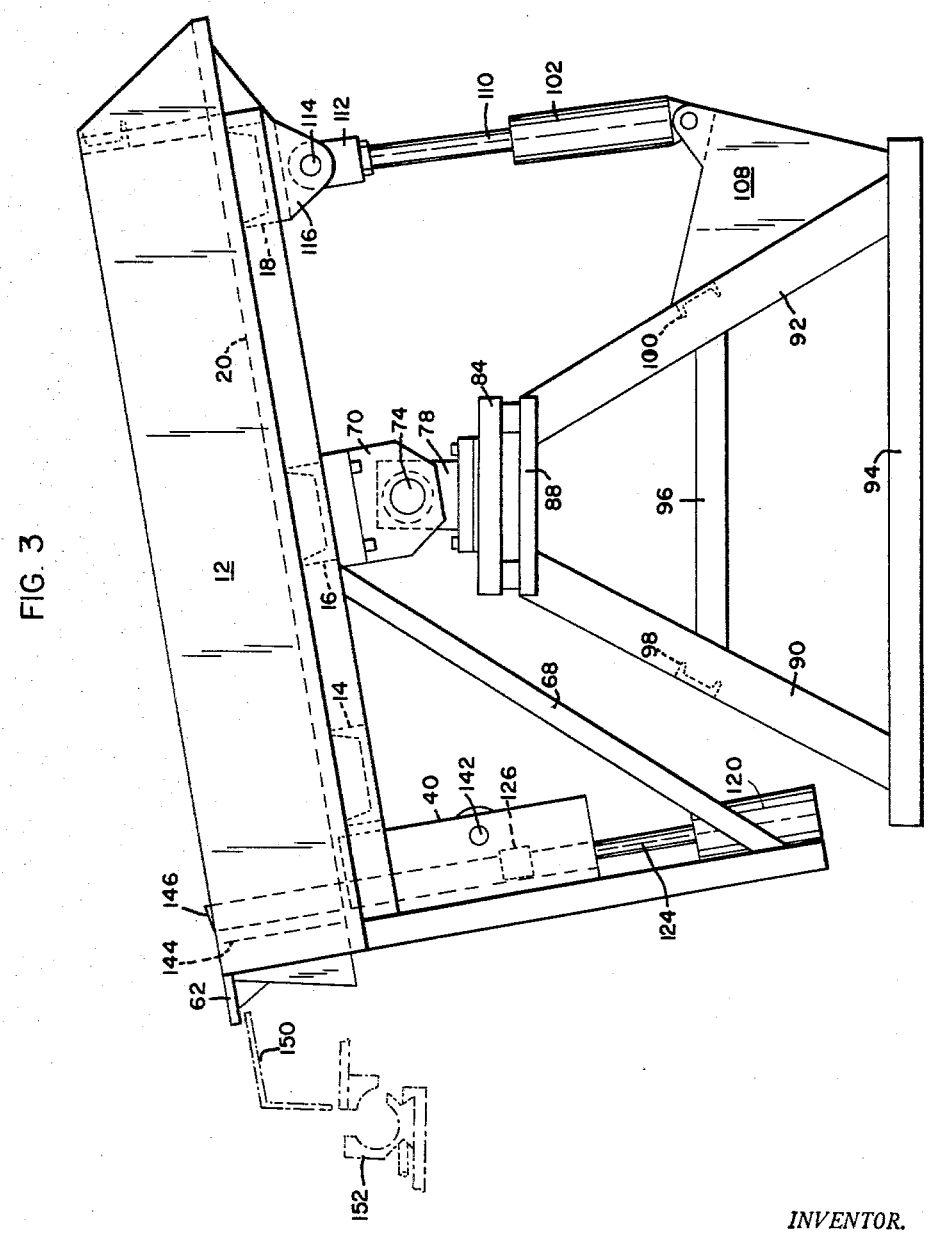
FIGURE 3 is a view similar to FIGURE 2, with the device shown in a different position of operation.

As best seen in FIGURES 1, 2 and 3, certain of the members 42 through 56 are joined to and braced by angularly extending struts 68, which extend between the lower ends of the members 42 through 56, and the side edge of the central channel pieces 16. As also seen in FIGURES 2, and 3, the channel pieces 16 are provided at 3 spaced places with clevis brackets 70 which are affixed to the underside of the channel members 16 by any suitable means, such as bolts 70. The clevis brackets 72 carry a bearing pin 74 which passes through the legs of the clevis bracket, and a bearing 76 carried thereby and through an apertured upstanding boss 78 carried by a mounting plate 80. The mounting plate 80 is affixed by bolts 82 to the upper plate 84 of a resilient support member and the plate 84 is connected by the resilient mounting blocks 86 to the lower plate 88, which in turn is supported by a plurality of angularly upwardly extending legs 90 and 92.

The lower ends of the legs are affixed to a base plate 94, and the legs are braced intermediate their ends by a cross piece 96. Each pair of legs 90 and 92 are connected together by a pair of lengthwise extending side rails 98 and 100, all whereby to give the supporting structure for the box sufficient rigidity.

The mounting of the box on the supporting structure by means of the clevis brackets 70 and bearings 76 permit oscillation of the box about the horizontal plane. The oscillation of the box is effected by three tilt cylinders 102 which have a bracket 104 affixed between apertured ears 106 of a pair of plates 108 affixed to and carried by three of the support legs 92. The rod 110 of the cylinder 102 has a clevis 112 connected to its outer end, and the clevis is connected by means of a pin 114 to a depending boss 116 affixed to the underside of the channel member 18 at three spaced positions along the channel member 18. Accordingly, it will be seen that when fluid is admitted to the lower end of the cylinders 102, the box will be oscillated in a counter-clockwise direction as viewed in FIGURES 2 and 3, about the axis of the bearing pins 74 to about 10° from the horizontal plane, and when fluid is admitted to the upper end of the cylinder 102, the box will be oscillated clockwise 10° of the horizontal plane.

The box may be mechanically locked in a horizontal position by any suitable means, and when a bar stock bundle has been loaded into the box and is positioned on the floor members 20 thereof, and the bundle straps have been removed from the bundle, the bars will be sorted and unscrambled by repeated clockwise and counter-clockwise oscillations of the box, whereupon the bars may be discharged in one-at-a-time fashion over the side edge of the box opposite the tilt cylinders 102.

Referring now to FIGURES 2, 3 and 4, it will be seen that the lower connecting member 64 has a pair of discharge cylinders 120 and 122 affixed thereto, and upstanding therefrom. The rods 124 of these cylinders are connected by means of a coupler 126 to a rack 128 formed along its inner side with a plurality of teeth 130. The housing 40, into which the rack 128 extends, has a pinion 132 journalled therein, and the pinion 132 is formed with a plurality of teeth 134, which mesh with the teeth 130 formed on the rack 128. Carried by the pinion 132 and extending out of either side of the box 40, is a shaft 136, which is connected by tubular couplers 138 and 140 to shaft members 142 extending out of the remaining housing 40. Each of the remaining housings has a pinion similar to the pinion 132 journalled therein which meshes with a rack similar to the rack 128, and which reciprocates in and out of the housing 40 along a plate 144 which extends upwardly from each of the housings 40.

As best seen at FIGURE 3, the upper end of the rack 128 is beveled as at 146 to form a discharge pin, whereby a piece of bar stock, indicated at B in FIGURE 2, will be separated and moved upwardly upon rotation of the pinion through action of the discharge cylinder 120 and rack 128. When the bar stock B reaches the upper limit of travel of the discharge pin 146, it is coplanar with the discharge plates 60 and 62, and will roll over the plates when the box is mechanically locked in the discharge position shown in FIGURE 3 to discharge the bar stock on to the upper plate 150 of the magazine of a bar stock machine, shown in phantom lines in FIGURES 2 and 3, whereby the bar stock will be guided by the plate 150 into the channel feed tube 152, also shown in phantom lines, of the bar stock feed machine. The mechanical locking means (not shown) may be of any suitable type and comprises no part of this invention.

In order to accommodate bar stock of different diameter and to insure that such bar stock will only be discharged in single fashion, the support members 44, 46, 48, 50, 52 and 54 are provided with guide plates 154 which may be moved inwardly into the opening of the box to insure that the pin 146 will only pick off a single piece of bar stock upon its upward movement. As best seen in FIGURE 2, the plates 154 are provided with a pair of elongated openings 156 and 158, through which a pair of bolts 160 pass, the ends of the bolts 160 being received in threaded apertures formed in the upstanding support members 44, 46, 48, 50, 52 and 54, all whereby the plates may be moved inwardly and outwardly and affixed in selected positions of adjustment. Each of the upstanding support members 42 through 56, inclusive, is provided with a gusset plate 162, which is affixed along one edge to the support member, and along its opposite edge to the underside of the discharge plates 60 and 62, in order to fixedly support the discharge plates.

It will be seen, therefore, that the stock bars in the bundle may be unscrambled by the oscillation of the box of the machine through the medium of the tilt cylinders 102, and thereafter, the bar stock may be discharged in single fashion through the operation of the discharge cylinders 120, each discharge cylinder 120 serving to operate three discharge pins 146 through the connection of the pinion 132 to similar pinions in each of the housings 40 by means of the connectors 138 and 140.

What I claim is:

A stock bar bundle unscrambling and discharging machine for use in conjunction with a bar feeding machine having a magazine feed plate and a feed tube, said bundle unscrambling and discharging machine comprising a bundle receiving surface, said surface being enclosed at its opposite sides, the means for selectively and alternatively oscillating said surface in sequential fashion a predetermined amount in each direction about a central axis to unscramble said bundle, discharge means selectively operable in one of said oscillated positions for discharging stock bars in single fashion over one of said enclosed sides and on to the bar feeding machine magazine plate and into the bar feeding machine feed tube, said discharge means including at least one reciprocating discharge finger movable in a direction transverse to the surface on which the bar stock is carried in said machine, said discharge finger having a beveled contact surface for separating and engaging a single stock bar between said contact surface and the enclosed side of said bundle unscrambling machine and moving said stock bar upwardly along said side to discharge said stock bar over the upper edge of said side and on to the magazine plate of said bar feeding machine and selectively adjustable means carried by the discharge side of said bundle unscrambling machine to vary the distance between said side and the upper edge of the beveled contact surface of said discharge finger to accommodate bar stock of varying cross-sectional dimensions.

References Cited by the Examiner

UNITED STATES PATENTS

| | | | |
|---|---|---|---|
| 908,923 | 1/1909 | White | 221—254 X |
| 1,889,039 | 11/1932 | Quinn | 198—219 X |
| 2,856,080 | 10/1958 | Mitchell | 221—290 X |
| 3,157,292 | 11/1964 | Pachell. | |

FOREIGN PATENTS

| | | |
|---|---|---|
| 88,517 | 2/1960 | Denmark. |
| 873,341 | 7/1961 | Great Britain. |

MARVIN A. CHAMPION, *Primary Examiner.*